358-140. OR 3,582,543 SR

[redacted]

United States Patent

[11] 3,582,543

[72] Inventors Robin D. Davies
Horley;
George D. Monteath, Tadworth, both of Surrey, England
[21] Appl. No. 765,305
[22] Filed Oct. 7, 1968
[45] Patented June 1, 1971
[73] Assignees The Marconi Company Limited;
Standard Telephones & Cables Limited
both of London, England
[32] Priority Oct. 10, 1967
[33] Great Britain
[31] 46246/67

[54] TELEVISION STANDARDS CONVERSION
8 Claims, 12 Drawing Figs.

[52] U.S. Cl. .......... 178/6.8
[51] Int. Cl. .......... H04n 5/02
[50] Field of Search .......... 178/6.8, 5.4; 328/55, 56; 333/29

[56] References Cited
UNITED STATES PATENTS
3,400,211 9/1968 Rainger et al. .......... 178/6.8
3,457,369 7/1969 Davies et al. .......... 178/6.8
OTHER REFERENCES
" Field-Store Standards Conversion," W. Wharton and R. E. Davies, Proc. I.E.E., Vol. 113, No. 6, June 1966, page 992

*Primary Examiner*—Richard Murray
*Assistant Examiner*—Alfred H. Eddleman
*Attorney*—Roberts, Cushman & Grover

ABSTRACT: A method of and apparatus for television standards conversion in which an input signal is delayed to provide simultaneously with any input line at least one delayed signal which is a line from a previous field and for each output line there is selected one line from the set comprising the delayed and undelayed lines and linear combinations thereof, the selection being made by allotting to each line of the set a predetermined range of positions in the picture for a range of times of occurrence and selecting as the output line at any instant and at any position in the picture that line of the set within whose range the said instant and said position fall.

T5055

TELEVISION STANDARDS CONVERSION

This invention relates to the conversion of television signals from one field repetition frequency to another.

The invention has particular, but not exclusive, application to conversion between television signals having 60 fields per second and 525 lines per picture (hereinafter referred to as 525/60 signals) and television signals having 50 fields per second and 625 lines per picture (hereinafter referred to as 625/50 signals). The invention also has particular, but not exclusive, application to the conversion of television signals in which each picture is made up of two fields, the lines of which are interlaced.

Apparatus for achieving conversion between 525/60 signals and 625/50 signals is fully described in British Pat. Specifications Nos. 1,052,438 and 1,068,101 and in corresponding U.S. Pat. NOs. 3,400,211 and 3,547,369 assigned to the assignees of the present application. In these specifications it is shown that line signals suitable for transmission on the output standard can be derived from the input-standard line signals by a process known as interpolation, in which signals from two adjacent lines in the input field are combined in an appropriate ratio. This process has several disadvantages:

1. Geometrical errors are introduced which give a serrated appearance to sloping straight lines in the picture. These serrations are particularly objectionably because they change position at low frequency;
2. Moiré patterns in the original picture flickering at half the field frequency are converted to Moiré patterns flickering at a much lower frequency; and
3. Due to the omission or duplication of fields movement in the picture appears to judder.

According to the present invention there is provided a method of generating from an input television signal an output television signal having a different field frequency, the method comprising the steps of delaying the input signal by an integral number of input field periods or by an integral number of input field periods plus or minus an integral number of half input line periods to provide, simultaneously with a line of a field of the input signal, at least one delayed signal which is a line from a previous input field, and selecting for each output line a line from the set comprising the input line and the delayed signal or signals and/or linear combinations thereof, the selection being made by allotting to each line of the set a predetermined range of positions in the picture for a range of times of occurrence and selecting as the output line at any instant and at any position in the picture that line of the set within whose ranges the said instant and said position fall. The term line is used here and elsewhere in this specification to mean the signal representative of a line.

In one preferred embodiment of the invention, each picture is made up of two fields the lines of which are interlaced. The delay is of one filed period plus and minus one half-line period to provide two delayed signals which correspond to the two picture lines immediately above and immediately below the line being applied to the input. These two picture lines are obtained from the field immediately preceding the field being applied to the input of the delay device.

One or more delayed lines may be combined with the input signal in an appropriate ratio and the combined signal may be applied to the input of the delay device.

According to the present invention there is further provided a converter for generating at an output terminal from an input television signal an output television signal having a different field frequency, the converter comprising a delay device for delaying the input signal by an integral number of input field periods or by an integral number of input field periods plus or minus an integral number of half input line periods to provide, simultaneously with a line of a field of the input signal, at least one delayed signal at the output of the delay device which is a line from a previous input field, means for selecting for each output line a line from amongst the set comprising the input line and the delayed signal or signals and/or linear combinations thereof, the selection being made by allotting to each line of the set a range of positions in the picture for a range of times of occurrence and selecting as the output line at any instant and at any position in the picture that line of the set within whose ranges the said instant and said position fall, and means for applying the selected line to the output terminal.

Certain embodiments of the invention will now be described, by way of example, with reference to the accompanying drawings, in which.

Figure 1:
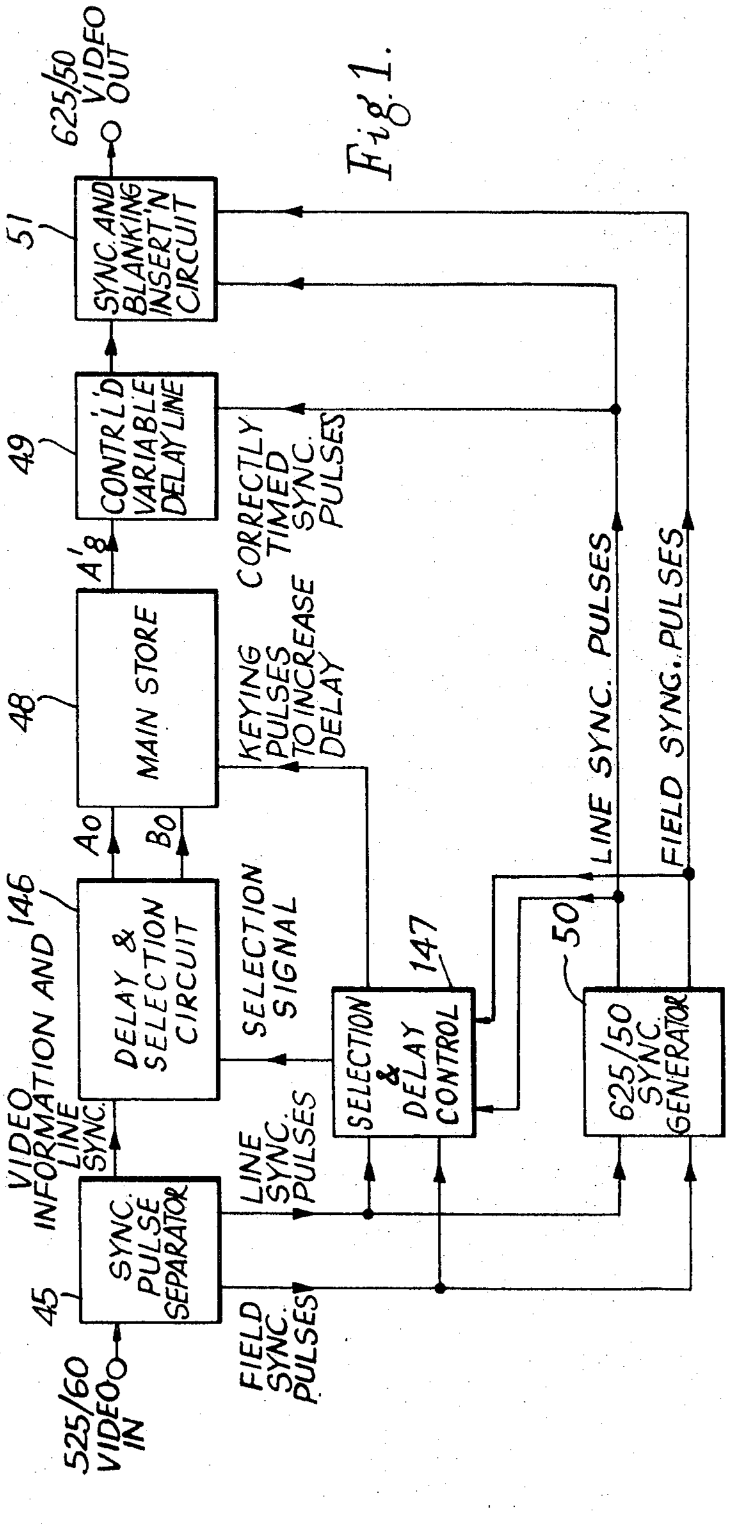
FIG. 1 is a block diagram of the circuit of a converter embodying the invention, and is based on FIG. 8 of the aforementioned Specification No. 1,052,438.
Figure 3A:
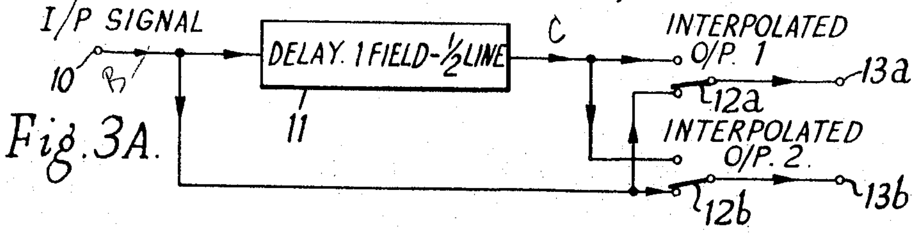
Figures 3B, 3C:
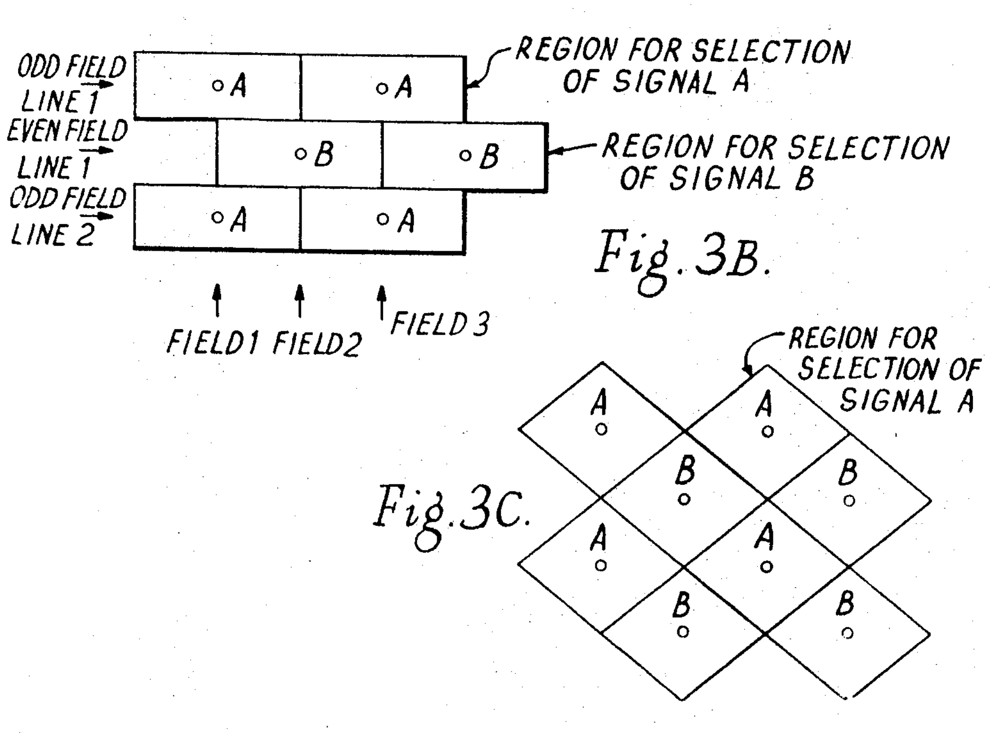
Figures 4A, 4B, 5A:
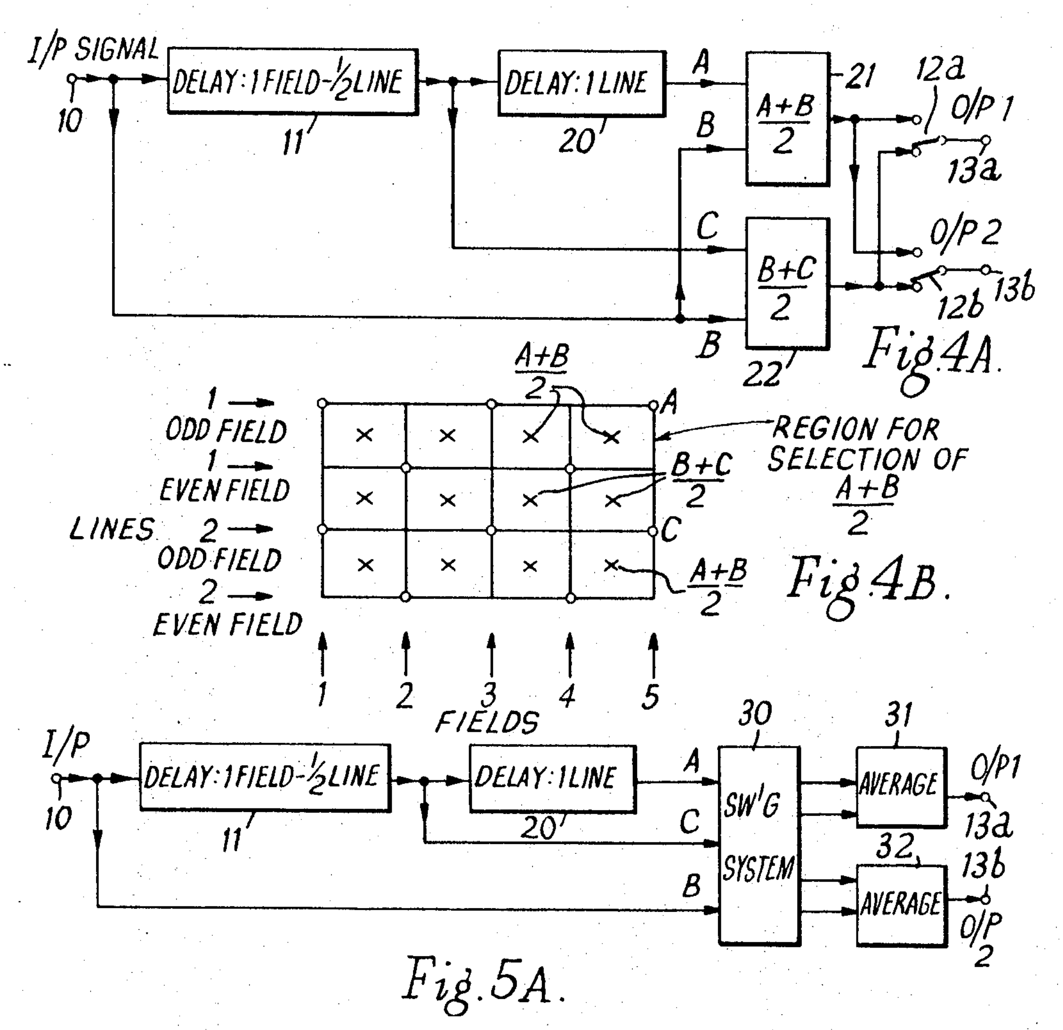
Figure 5B:
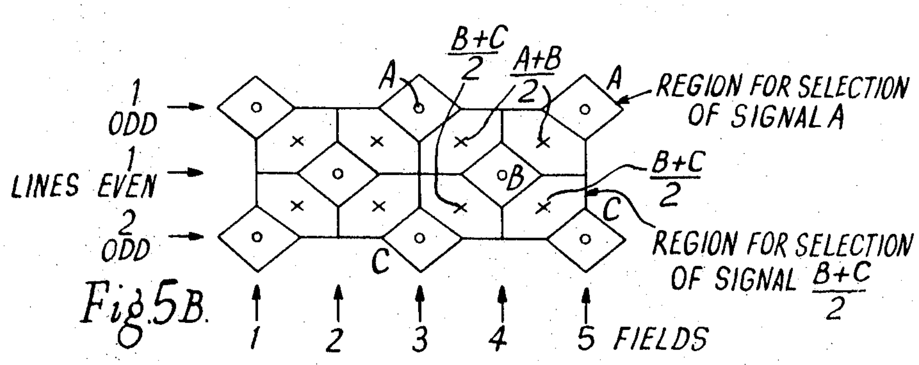
Figure 6:
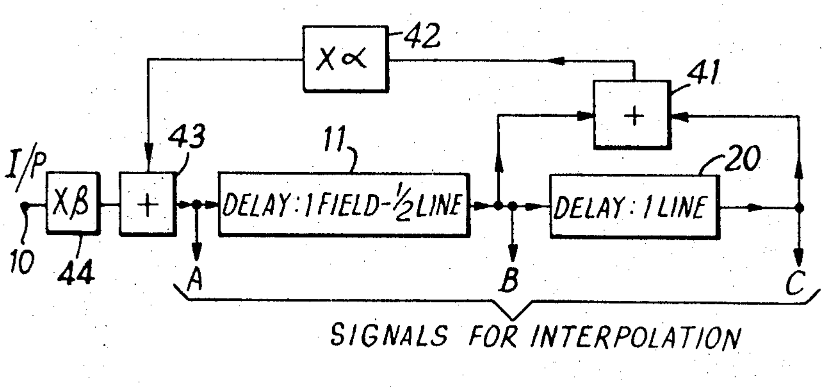
Figure 7A:
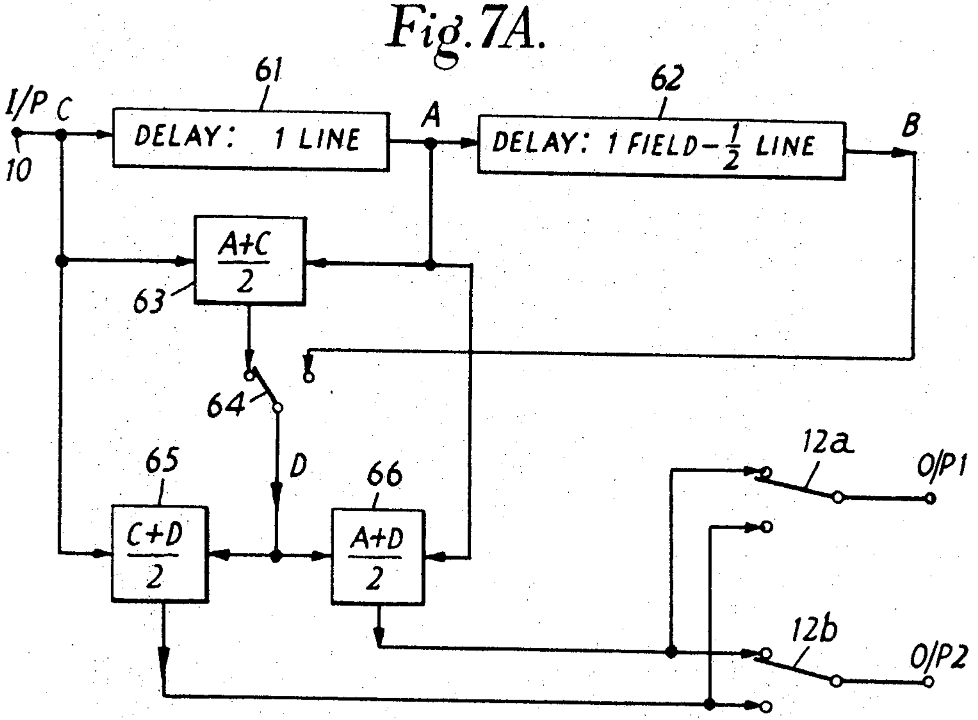
Figure 7B:
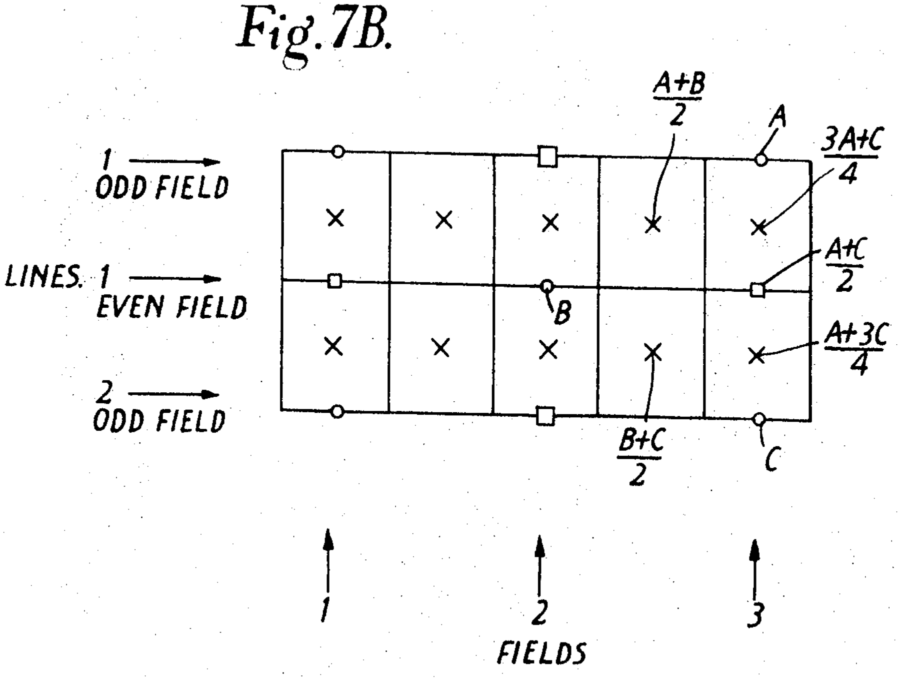

FIG. 3*a* is a block diagram of a circuit suitable for use as the selection circuit of the converter of FIG. 1;

FIGS. 3*b* and 3*c* show possible schemes for the selection of the output signal of the circuit of FIG. 3*a*;

FIG. 4*a* is a block diagram of a second circuit suitable for use as the selection circuit of the converter of FIG. 1;

FIG. 4*b* shows a possible scheme for the selection of the output signal of the circuit of FIG. 4*a*;

FIG. 5*a* is a block diagram of a third circuit suitable for use as the selection circuit of the converter of FIG. 1;

FIG. 5*b* shows a possible scheme for the selection of the output signal of the circuit of FIG. 5*a*;

FIG. 6 is a block diagram of part of a fourth circuit suitable for use as the selection circuit of the converter of FIG. 1;

FIG. 7*a* is a block diagram of part of a fifth circuit suitable for use as the selection circuit of the converter of FIG. 1; and FIG. 7*b* shows a possible scheme for the selection of the output signal of the circuit of FIG. 7*a*.

The converter shown in FIG. 1 is for use in converting a 525/60 signal to a 625/50 signal. The signals form pictures in which the lines are scanned horizontally and each picture comprises two fields, the lines of which are interlaced. The converter shown in FIG. 1 differs from the converter described with references to and shown in FIG. 8 of the aforementioned Specification No. 1,052,438 only in that the interpolation circuit 46 is replaced by a delay and selection circuit 146, and that the waveform generator 47 is replaced by a selection and delay control circuit 147. For a full description of the rest of the circuit and of the operation of the converter, reference should be made to the aforementioned Specification No. 1,052,438. A brief description of the operation of the converter will now be given.

In order to convert from a 525/60 signal to a 625/50 signal it is necessary to repeat every fifth or sixth line, and to remove every sixth field from the input signal. The repetition of every fifth or sixth line is achieved in the main store 48, which has two inputs A*o* and B*o* for receiving two outputs from the selection circuit 146. The removal of every sixth field is achieved in the selection circuit 146.

The 525/60 input signal passes first through a synchronizing pulse separator 45 and then into the selection circuit 146, which produces the required inputs for terminals A*o* and B*o*. At the same time that every fifth (or sixth) line is applied to A*o*, a line (usually an adjacent line but possibly the same line) is applied to B*o*. A selection and delay control circuit 147 has inputs of the field and line synchronizing pulses of both the input and the output signals.

The output of the main store 48 is applied to a controlled variable delay device 49 which correct timing errors which arise during conversion. The output of the device 49 is applied to a synchronizing and blanking-insertion circuit 51 controlled by the 625/50 synchronizing pulse generator 50. The output of the circuit 51 constitutes the output of the converter.

In the selection circuit 146, the selection of the output line is made from amongst some or all of the following:

1. The current input line signal.
2. The line signal immediately above (1) in the picture (i.e. the output of a field plus a half line delay).
3. The line signal immediately below (1) (i.e. the output of a field minus a half line delay).
4. Combinations (e.g. the average) of (1) and (2) or (3).
5. Combinations (e.g. the average) of (2) and (3).

The appropriate choice of these five signals will be described with reference to FIG. 2. The positions of input standard lines are shown as circles relative to time and vertical position axes, the time axis being used to indicate successive fields. Although the line takes a finite time to scan, this time is very small when compared with a field period, and so the line can effectively be represented by a point on the diagram, indicated by a circle. More accurately, the point can be considered as representing the beginning of the line.

The points form a diagonal pattern since successive fields are interlaced. If the current line is represented by point B, the lines immediately above and below in the picture as obtained through a field ± a half line delay are respectively A and C. The averages (A+B)/20 and (B+C)/2 represent, most appropriately, lines at the positions marked in FIG. 2 with a cross.

The position of a required output line signal may be referred to the same diagram. Its vertical position depends on its position in the raster relative to input signal lines and its horizontal position depends on the time of the output field relative to the input field times. Selection, (or interpolation) is carried out by choosing an input line signal (such as A, B or C in FIG. 2) or a derived signal (such as (A+B)/2 or (B+C)/2 in FIG. 2) to form the output line signal. Clearly it is desirable to choose the signal which is closest to the output line position in FIG. 2. In order to effect the interpolation in practice each signal point in FIG. 2 may be surrounded by a small region not including any other point, so that all the regions completely cover the space. Each desired output line can also be given a representing point on the diagram of FIG. 2. This representing point will fall within the region surrounding a particular one of the input line points. It is this input line which is then transmitted as the output line.

FIG. 3*a* is a block diagram of a circuit suitable for use as the selection circuit 146 of the converter of FIG. 1. FIG. 3*a* shows an input 10 for receiving a signal at the input standard connected to a delay device 11 which provides a delay of one field period minus one half-line period. The input and the output of the delay device are each applied to each of two switches **12*a* and 12*b*, and the pole of each switch is connected to a respective output 13*a* or 13*b*, for connection to the main store 48 of the converter of FIG. 1. Thus, when in operation a line B (see FIG. 2) is applied to the input 10, the line C is appearing at the output of the delay device 11**, and either line C or line B can be selected at either output.

Figure 2:
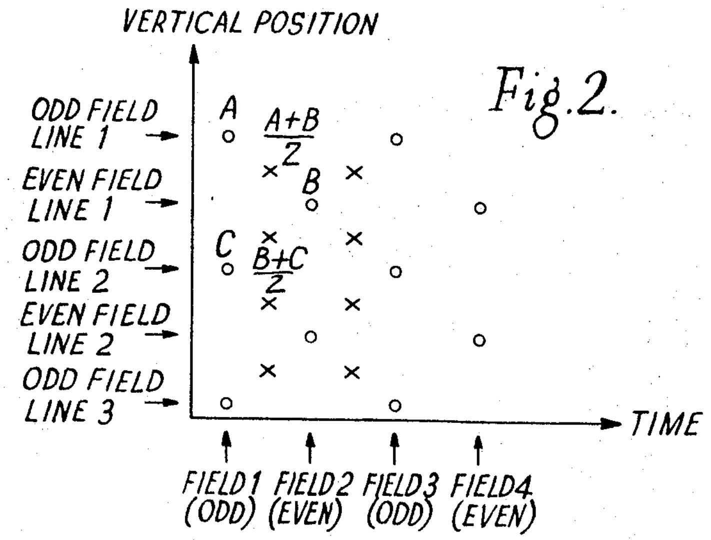
FIG. 2 is a diagram of the vertical position of a line plotted against time for the first five picture lines.

FIG. 3*b* shows one possible scheme for allocating regions of the vertical position versus time diagram for FIG. 2. Vertical interpolation using this scheme is good, but time interpolation to avoid movement judder, is poor. The scheme shown in FIG. 3*c* provides improved time interpolation and fair vertical interpolation.

FIG. 4*a* is a block diagram of a second circuit suitable for use as the selection circuit 146 of FIG. 1. An input 10 for receiving the input signal is connected to a delay device made up of two parts, a first device 11 of one field period minus one half-line period the output of which is connected to a second device 20 of one line period. There are therefore available three signals, the input signal B (see FIG. 2) and also signal C from the output of the device 11 and A from the output of the device 20, which correspond to the picture lines immediately below and immediately above the line B. The lines A and B are applied to an averaging circuit 21 which provide a signal (A+B)/2 at its output. The lines B and C are applied to another averaging circuit 22 which provides a signal (B+C)/2 at its output. The outputs of the averaging circuits 21 and 22 are each applied to each of two switches **12*a* and 12*b*, and the pole of each switch is connected to a respective output 13*a* or 13*b***, as in FIG. 3*a*. Thus either of the signals (A+B)2 and (B+C)/2 can be selected at either output.

FIG. 4*b* shows a possible scheme for allocating regions of the vertical position versus time diagram. Using this scheme vertical interpolation is good and time interpolation is fair.

FIG. 5*a* is a block diagram of a third circuit suitable for use as the selection circuit of the converter of FIG. 1. Part of the diagram comprising an input 10 and delay devices 11 and 20 is similar to FIG. 4*a* and is described above. The three signals A, B and C are all applied to a switching system 30 which is connected to two averaging circuits 31 and 32. The switching system applies to the averaging circuits the signals A, B, or C as required. Each averaging circuit has two inputs. The switching system may apply any of the following pairs of signals to each averaging circuit; A and A, A and B, B and B, B and C, or C and C. The averaging circuit then provides at its output the linear combinations A, (A+B)/2, B, (B+C)/2, or C respectively. Thus any of these five signals can be obtained at either output **13*a* or 13*b* by appropriate operation of the switching system 30, which is controlled by the selection and delay control 147** (see FIG. 1).

FIG. 5*b* shows one possible scheme for allocating regions of the vertical position versus time diagram, for the apparatus shown in FIG. 5*a*.

FIG. 7*a* is a block diagram of another circuit suitable for use as the selection circuit 146 of FIG. 1, and is based on the circuit shown in FIG. 4*a*. An input 10 is connected to a one-line delay device 61 which is in turn connected to a delay device 62 of one field minus one half-line period.

The input signal C and the output A of the delay device 61 are both applied to an averaging circuit which generates (A+C)/2. A switch 64 is arranged to select either the signal (A+C)/2 or the output B of the delay device 62. The signal selected by the switch, which may be called signal D, is applied to two averaging circuits 65 and 66 which generate (C+D)/2and (A+D)2 and the outputs of the averaging circuits 65 and 66 are connected to switches **12*a* and 12*b*** as in FIG. 4*a*.

When D is B, the output signals are (A+B)/2 and (B+C)/2, as in FIG. 4*a*, but when D is (A+C)2, the output signals are 3A+C/4 and A+3C/4. Thus, by using the switch 63 in conjunction with the switches **12*a* and 12*b***, four output signals are obtainable.

FIG. 7*b* shows a possible scheme for allocating regions of the vertical position versus time diagram. Using this scheme vertical interpolation is fair and movement interpolation is good.

The schemes shown in FIGS. 3*b*, 3*c*, 4*b*, 5*b* and 7*b* are only four possible schemes, and many others may be found convenient.

The converters above described use at most three adjacent picture lines which are combined in 1:1 ratio. Other ratios than 1:1 can be used. It may then be necessary to include signal multipliers as well as adders. By using only addition it is possible to combine R.F. signals.

The delay devices commonly employed require R.F. modulation of the signal and it is usually desirable to use frequency modulation to obtain gain stability. It is also possible to include further line delay devices so as to obtain access to more than three adjacent picture lines.

To obtain access to lines of more than one picture (as might be desirable for improving movement interpolation) it is necessary either to use more than one field or to recirculate the signals in one field delay device. This latter possibility requires the addition of a proportion of the signals obtained from the output of the field delay device to a proportion of the input of the field delay device and has the general effect on the picture of replacing movement judder by movement smear.

It is applicable to any of the above-mentioned converters in a manner indicated in FIG. 6. The circuit is basically similar to that shown in part of FIG. 4*a* and provides the three signals A, B and C, at the output of a delay device 11, the input of the delay device 11, and the output of a delay 20 respectively. The signals B and C are applied to an adder 41, the output of which is applied to a multiplier 42 which multiplies the input signal A+C by a factor $\alpha$. The multiplying factor $\alpha$ may be a constant or it may be a variable dependent on the relative phase of the input and output fields. Small values of $\alpha$ result in movement judder being only slightly diminished and in little movement smear, and the movement judder is reduced and the smear increased for larger values of $\alpha$. The output of the multiplier 42 is applied to an adder 43 which adds it to a proportion of the input signal obtained from the multiplier 44 and applies the combined signal to the input of the delay device 11.

The selection of lines is carried out by means of switches in the signal path, e.g. in FIG. 3*a* the switches 12*a* and 12*b*. Wave forms are applied from the selection and delay control 147 to the selection circuit 146 to control the switches. These waveforms are generated by detecting the relative phases of the input and output signal field-synchronizing pulses and the input and output signal line-synchronizing pulses, and applying signals so generated to digital circuitry which determines the region in which an output-signal line lies relative to the input signal, using one of the schemes described, such as that shown in FIG. 3*b*. In the systems described with reference to FIGS. 3*a* and 3*b*, and 4*a* and 4*b*, only the relative phase of the input and output signal line-synchronizing pulses need be detected, and the switch control waveforms are generated by circuitry which counts at the input line frequency. In the systems described with reference to FIGS. 3*a* and 3*c*, 5*a* and 5*b*, the relative phase of the input and output signal field-synchronizing pulses is detected first and is used to control the action of similar circuitry counting at the input line frequency.

The circuits which have been described and illustrated have all been designed for use with input television signals which have two interlaced fields per picture and an odd number of lines per picture. In these circumstances the input signal may be delayed by either an even number of input field periods, or an even number of field periods ± an even number of half-line periods, or, as has been described in detail above, an odd number of field periods ± an odd number of half-line periods.

However, for other standards the selection may be made from different delay periods. For example, for a noninterlaced picture with one field per picture, the selection will be made from any number of field periods ± any whole number, including zero, of line periods.

We claim:

1. A converter for generating at an output terminal from an input television signal an output television signal having a different field frequency, said converter comprising a delay device connected to delay said input signal by an integral number of input field periods or by an integral number of input field periods plus or minus an integral number of half input line-periods to provide, simultaneously with a line of a field of said input signal, at least one delayed signal at the output of said delay device which is a line from a previous input field;

coupling means connected to said delay device and to receive said input signal to simultaneously provide said input signal, said delay signal or signals and/or linear combinations thereof;

switching means connected to said coupling means to select for each output line a line from amongst the set comprising said input line and said delayed signal or signals and/or linear combinations thereof, the selection being made by allotting to each line of the set a range of positions in the picture for a range of times of occurrence and switching as the output line at any instant and at any position in the picture that line of the set within whose ranges the said instant and said position fall; and means connected to said switching means for applying the selected line to said output terminal.

2. A converter according to claim 1, wherein said delay device is arranged to delay said input signal by one input field period plus or minus an odd integral number of half input line periods.

3. A converter according to claim 1, further comprising means connected to said delay device for combining one or more delayed signals with said input signal and applying the combined signal to the input of said delay device.

4. A method of generating from an input television signal an output television signal having a different field frequency, the method comprising the steps of:

delaying said input signal by an integral number of input field periods or by an integral number of input field periods plus or minus an integral number of half input line-periods to provide, simultaneously with a line of a field of said input signal, at least one delayed signal which is a line from a previous input field;

Simultaneously providing said input signal, said delayed signal, or signals and/or linear combinations thereof; and selecting for each output line a line from the set comprising said input line and said delayed signal or signals and/or linear combinations thereof, the selection being made by allotting to each line of the set a predetermined range of positions in the picture for a range of times of concurrence and switching as the output line at any instant and at any position in the picture that line of the set within whose ranges the said instant and said position fall.

5. A method according to claim 4, wherein said input and output television signals are each representative of pictures which are made up of two interlaced fields.

6. A method according to claim 5, wherein each picture comprises an odd number of lines.

7. A method according to claim 6, wherein said input signals is delayed by one input field period plus or minus an odd integral number of half input line-periods.

8. A method according to claim 4 wherein one or more delayed lines are combined with said input signal and the combined signal is applied to said delay device.